United States Patent [19]

Kudo et al.

[11] Patent Number: 4,879,082

[45] Date of Patent: Nov. 7, 1989

[54] METHOD FOR MOLDING PLASTIC MATERIAL INTO DISK SHAPED SABSTRATE FOR AN OPTICAL INFORMATION RECORD CARRIER

[75] Inventors: Junichiro Kudo; Yoshihiro Shimizu, both of Miyagi, Japan

[73] Assignee: Sony Corporation, Tokyo, Japan

[21] Appl. No.: 126,043

[22] Filed: Nov. 27, 1987

[30] Foreign Application Priority Data

Nov. 28, 1986 [JP] Japan .................. 61-283615

[51] Int. Cl.⁴ ............................................. B29D 11/00
[52] U.S. Cl. ..................................... 264/106; 264/1.3; 425/149; 425/810
[58] Field of Search ................. 264/1.1, 1.3, 106, 107, 264/328.7, 2.2, 40.5, 2.6; 425/149, 810

[56] References Cited

U.S. PATENT DOCUMENTS

| | | | |
|---|---|---|---|
| 4,302,411 | 11/1981 | Nakagawa et al. | 425/810 |
| 4,411,609 | 10/1983 | Yoshii et al. | 425/149 |
| 4,414,167 | 11/1983 | Prusak et al. | 425/149 |
| 4,426,341 | 1/1984 | Tsuzuku et al. | 425/149 |
| 4,707,321 | 11/1987 | Segawa et al. | 264/1.3 |
| 4,734,477 | 3/1988 | Inoue et al. | 264/1.3 |

FOREIGN PATENT DOCUMENTS 181115 8/1987 Japan ...................... 264/1.1

Primary Examiner—James Lowe
Attorney, Agent, or Firm—Hill, Van Santen, Steadman & Simpson

[57] ABSTRACT

A method for molding a substrate for optical information record carrier is disclosed which results in small double refraction with superior transfer characteristics of a surface of a stamper. The method comprises the steps of injecting molten resin into a cavity formed by a stationary mold and movable mold under application of mold clamp pressure between said molds, releasing the mold clamp pressure at predetermined timing after injection of said molten resin is completed and the molten resin is partially solidified, holding said resin in the molds under the released mold clamp pressure condition until the resin is solidified, and taking out the molded substrate from the molds.

5 Claims, 5 Drawing Sheets

METHOD FOR MOLDING PLASTIC MATERIAL INTO DISK SHAPED SABSTRATE FOR AN OPTICAL INFORMATION RECORD CARRIER

BACKGROUND OF THE INVENTION

This invention relates to a method for injection molding of a disk shaped substrate for an optical information record carrier formed of polycarbonate resin, such as the magneto-optical recording medium or the write once type recording medium.

The optical recording system can record and/or reproduce in contact-free manner, can be handled easily and is invulnerable to demage or contamination, while it has the recording capacity about tens or hundreds of times larger than that of the conventional magnetic recording system. Thus it is practically used in a compact disk having digitally recorded audio signals or a video disk having recorded video signals, while it is expected to be used in large capacity information record file, such as code or image information.

Various types of the optical recording media of the optical recording system are known in addition to the aforementioned compact disks or video disks, such as write once type optical disk, erasable optical disk or the magneto-optical disk. These disks are comprised of a recording layer for the optical information formed on an transparent disk of polycarbonate resin or PMMA (polymethethylmethacrylate) resin. Various demands have been raised in forming the disks.

Typical of these demands are the reduced double refraction which means phases shift between the disk signal readout incident light and reflected light and, mainly is caused by the internal strain of the disk, optimum transfer properties and surface smoothness, reduced contamination and reduced deflection (skew) of the formed surface. Above all, it is required of the magneto-optical disk to reduce double refraction caused in the transparent disk, since it is adapted to read out as signals only minute rotations of the plane of polarization of the irradiated laser light.

Under these circumstances, evolution in the art of injection molding is carried out in many aspects so that it is now possible to produce the polycarbonate resin disk which is almost completely free of double refraction at the time of forming.

However, as a result of our further investigations, it has been found that, while it is possible to produce the disk showing only reduced double refraction at the initial stage after termination of the molding under the conventional injection molding art, the double refraction when being used was changed chronologically and, above all, shifted towards the minus side, thus resulting in increase of the double refraction. The tendency is outstanding in an internal area with a magneto-optical disk having a central hub for assuring the chucking accuracy relative to the recording and reproducing apparatus. For example, when it is used in the apparatus, it is becoming difficult to assure a normal operation because of increased double refraction.

In the present invention, the polarity of double refraction that is, minus or plus, is defined in such a manner that the direction in which double refraction on the inside area of the formed disk heated to 100° C. is changed is defined as minus, with the direction opposite thereto being defined as plus. The double refraction is a phenomenon that takes place when the light passes through a medium having variable refractive indices along the directions within the same plane, such medium being anisotropic with respect to the refractive index. For example, with the refractive index in a prescribed direction (x-direction) as $n_x$ and with that in a direction orthogonal thereto (y-direction) as $n_y$, phase shift is caused between the x-component (the light having the plane of polarization parallel to the x-direction) and the y-component (the light having the plane of polarization parallel to the y-direction). The phase difference $\delta$ is given by $$\delta = 2\lambda/\pi \cdot (n_x - n_y)d \qquad \ldots (1)$$

wherein $\delta$: wavelength of light and d: the distance in the medium traversed by light. The direction in which the phase difference $\delta$ of the transmitted light is changed chronologically or under the aforementioned heating conditions was defined as the minus direction, with the direction opposite thereto being defined as the plus direction.

Although it may be thought to produce the disk having double refraction previously set to the plus side, in order to manage the aforementioned chronological changes, the current situation is necessarily to sacrifice other properties.

That is, in order to obtain the plus double refraction of the produced disk, it is necessary to increase the temperature of the resin or the mold during the injection molding. However an increase in the mold temperature results in curved or warped disk and loss of smoothness, while an increase in the resin temperature results in decomposition of the resin and increased contamination. When forming under a lesser pressure, it is possible to produce a disk having a plus double refraction. In such case, however, transfer characteristics are lowered, while it becomes difficult to assure a flatness of the hub attaching reference plane and skew is also increased.

OBJECT AND SUMMARY OF THE INVENTION

It is an object of the present invention to provide an improved method for molding plastic material into a disk shaped substrate for an optical information record carrier.

It is another object of the present invention to provide a method for molding plastic material into a disk shaped substrate having small double refraction caused by time lapse.

It is a further object of the present invention to provide a molding method of plastic material having superior transfer characteristics of a surface of a stamper.

According to one aspect of the present invention, there is provided a method for molding plastic material into a disk shaped substrate for an optical information record carrier which comprises the steps of, injecting molten resin into a cavity defined between a stationary mold and a movable mold under an application of mold clamp pressure between the molds to form a disk shaped substrate, releasing the moldclamp pressure at a predetermined timing after the resin injection is completed and the resin is partially solidified, holding the resin in the mold under the released mold clamp pressure condition until the resin is solidified and taking out the molded substrate from the mold.

BRIEF DESCRIPTION OF THE DRAWINGS

FIGS. 2 to 4 are schematic sectional views showing the injection molding process in the order of the process steps, wherein FIG. 2 shows the mold closure state, FIG. 3 the molten resin charging state and FIG. 4 the mold clamping state.

DESCRIPTION OF THE PREFERRED EMBODIMENT

As a result of our researches into attaining the above objects, the present inventors have arrived at a finding that the initial value of double refraction is to be controlled by the timing of releasing the mold clamping pressure that is released before the disk solidifies completely.

Based on this finding, the present invention resides in a method for injection molding of a disk wherein the molten resin is injected into a cavity defined between a stationary metal mold and a movable metal mold to form a disk, said method comprising substantially releasing the mold clamp pressure of said movable metal mold at a predetermined timing after the termination of a resin injection step and until the resin is solidified, holding the resin in this state until it is solidified and taking out the molded disk of said resin.

When molding a disk by injecting the molten resin into a cavity defined between a stationary mold and a movable mold, if the mold clamp pressure applied to the metal mold since the time of termination of injection of the resin material until the resin is solidified is released, the double refraction especially on the inside area of the disk is shifted to the plus side for controlling the initial value of double refraction dependinig on the releasing timing.

Also, since the uniform pressure is applied immediately after the injection on the overall disk surface with a prescribed mold clamp pressure, sufficient transfer characteristics are assured. Since the mold clamp pressure is released after the peripheral portion is solidified to some extent, there is no risk that the transfer characteristics are badly affected.

In addition, the metal mold is maintained in the contact state with the disk even after releasing the mold clamp pressure, there is no risk of disk deflection or warping.

An embodiment of the injection molding of the disk in accordance with the present invention will be described in the sequence of the process steps thereof and by referring to the accompanying drawings.

The construction of an injection molding machine employed in practicing the present embodiment is firstly explained.

Figure 1:
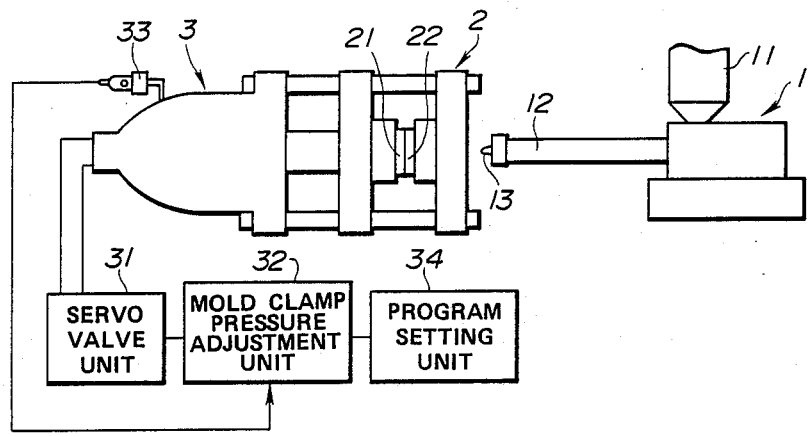
FIG. 1 is a schematic side elevation showing an example of an injection molding machine employed in practicing the present invention.

As shown in FIG. 1, the injection molding machine is roughly classified into a resin injection part (1) for melting and feeding the molten resin into the metal mold, a metallic mold part (2) for forming a cavity in accordance with the disk shape, and a mold clamp mechanism (3) for applying a pressure to the metal molod part (2).

The resin injection part (1) is comprised of a charging hopper (11) into which are charged the resin pellets as the starting material, a heating cylinder (12) provided with a peripheral heater and an inside screw for successively feeding out molten resin, and a nozzle (13) through which the molten resin material is ejected. The resin material supplied from the charging hopper (11) is successively molten and the molten resin is fed out at the end of the nozzle (13).

Figure 2:
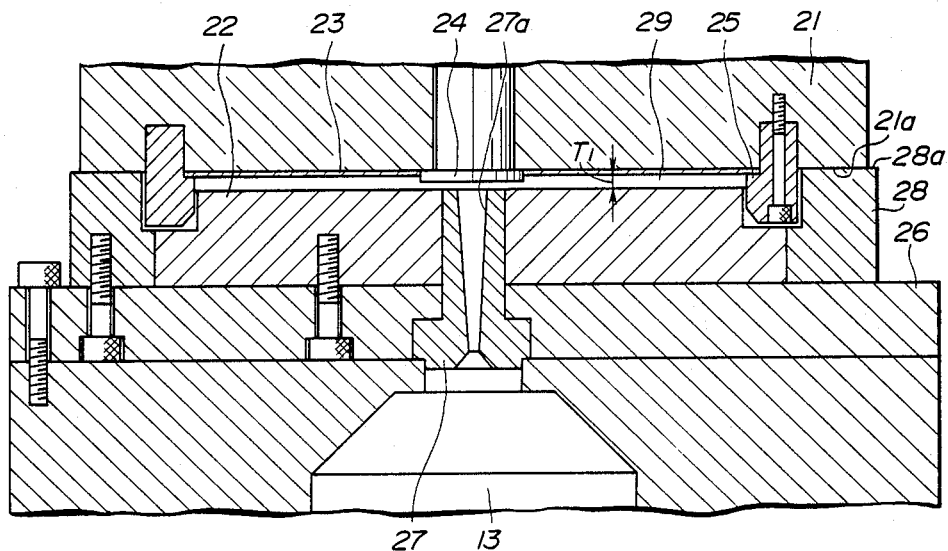

The metal mold part (2) is mainly composed of a movable metal mold (21) and a stationary metal mold (22), as shown in FIG. 2, there being a stamper (23) secured to the movable metal mold (21) by an inside stamper holder (24) and an outside stamper holder (25). The stationary metal mold (22) is secured to a stationary plate (26) and has a central rein injection opening (27) coupled to a nozzle (13) of the resin injection part (1) and having an end opening (27a). To the peripheral part of the stationary metal mold (22), there is provided a metal mold holder (28) secured to the stationary plate (26). The outer peripheral portion (21a) of the movable metal mold (21) abuts on an end face (28a) of the mold holder (28) to close the mold, such that the cavity (29) is defined as the prescribed space between the metal molds (21) and (22).

The mold clamp mechanism (3) is provided to the metal mold part (2) to reciprocate the movable metal mold (21). In the present embodiment, a so-called booster ram type mold pressure mechanism is adopted as the mold clamp mechanism (3). This booster ram type mold clamp mechanism has a booster ram of a diameter lesser than the diameter of a main ram inserted coaxially as the center axis of the main ram for advancing the main ram at a higher speed, and is widely used in the medium sized injection molding machine. A servo valve unit (31) is connected to the mold clamp mechanism (3) and adapted to be controlled by a mold clamp pressure adjustment unit (32). The mold clamp pressure adjustment unit (32) is connected via a pressure sensor (33) to the aforementioned mold clamp mechanism (3). The mold clamp pressure applied to the movable metal mold (21) by the operation of the mold clamp mechanism (3) is sensed by the pressure sensor (33), the resulting sensor signals controlling the mold clamp pressure adjustment unit (32) to control the servo valve unit (31). To the mold clamp pressure adjustment unit (32) is also connected a program setting unit (34). The application timing of the mold clamp pressure of the movable metal mold (21) is stored in the program setting unit (34) so that the output of the setting unit (34) is applied to the mold clamp pressure adjustment unit (32) to control it to actuate the servo valve unit (31) to control the oil pressure and the operating time of the mold clamp unit (3) thereby to change the mold clamp pressure of the movable metal mold (21) during or after the injection process of injecting the molten resin material into the cavity (29) between the movable metal mold (21) and the stationary metal mold (22). It is noted that, when considering the application to the embodiment of the present invention, digital control of the metal clamp pressure and quick response properties (for example, termination of the decompression within 0.5 second from 140 kg/cm$^2$ to zero kg/cm$^2$) are desirable.

Figure 5:
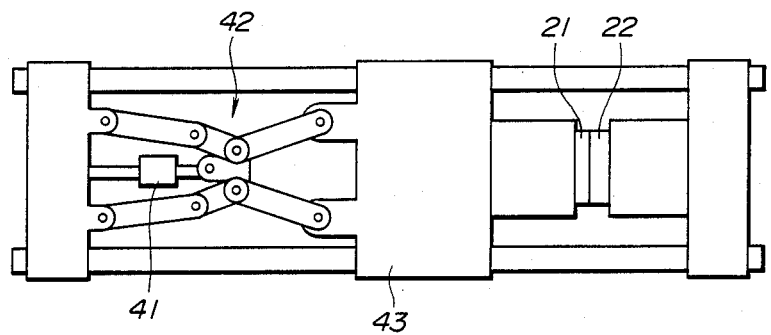
FIG. 5 is a schematic side elevation showing another example of the mold clamp unit of the injection molding machine.

The so-called toggle type mold clamp mechanism shown for example in FIG. 5 as well as the aforementioned booster ram type clamp unit may be used as the mold clamp unit (3). The toggle type mold clamp unit is designed to enhance the force of the mold clamp cylinder (41) by a link unit (42) called a toggle to produce a large mold clamp pressure while providing for a high speed mold clamping. In an example shown in Fig. 5, a movable metal mold (21) is secured to the supporting disk (43). The mold clamp cylinder (41) is controlled by a mold clamp drive control circuit similar to one provided to the aforementioned booster ram type mold clamp mechanism to provide for rapid change in the mold clamp pressure of the movable metal mold (21).

The above described injection molding machine is used to form the disk of a polycarbonate resin. The molding method is described in detail.

For producing the disk as the substrate of the optical recording medium in the present embodiment, the outer peripheral part (21a) of the movable metal mold (21) is caused to abut on the end face (20a) of the mold holder (28) provided to the outer periphery of the stationary metal mold (22), as shown in FIG. 2, to maintain the metal mold in the closed state. In this state, the molten resin material (4) of the polycarbonate resin molten in the resin injection part (1) is injected into the cavity (29) through the nozzle (13) and the resin injection port (27).

When injecting the molten resin material (4), the resin temperature is preferably as low as possible, insofar as it is such as to permit uniform kneading of the resin in the heating cylinder (12) of the resin injection part (1). For example, it should be controlled to be lower than 330° C. at the maximum. With too high a resin temperature, the resin itself is decomposed to increase contamination.

The temperature of the movable metal mold (21) and the stationary metal mold (22) is preferably lower than the thermal deformation temperature of the disk in order to promote the molding cycle and to improve production efficiency and in view of skew characteristics. Therefore, with the glass trasition temperature Tg of the currently employed polycarbonate resin for disks of approximately 124°, it is set so as to be 110° to 120°, for example.

During the injection, the molten resin is filled into the cavity (29). In the present embodiment, the injection charging pressure is selected to be slightly higher than the mold clamp pressure applied to the movable metal mold (21).

Figure 3:
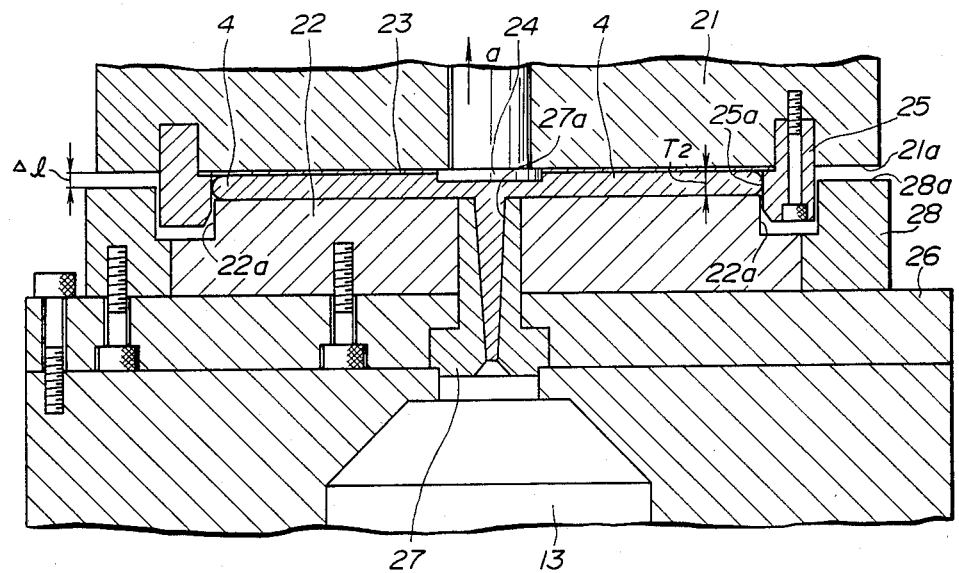

Hence, during injection of the molten resin material (4) into the cavity (29) of the metal mold part (2) kept in the mold closure state, the movable metal mold (21) is receded a distance $\Delta l$ under the charging pressure as shown by an arrow mark a, the distance between the two metal molds (21), (22) being enlarged from $T_1$ of FIG. 2 to $T_2$ of FIG. 3.

In such manner, the charging pressure is set so as to be slightly larger than the mold clamp pressure applied to the movable metal mold (21) to produce a gap between the metal molds (21) and (22), in such a manner that the pressure within the cavity (29) is leaked through the gap so that the molten resin material (4) is filled completely in the cavity (29) to make it possible to form the disk with a high dimensional accuracy. Since the metal mold (21) is opened under the charging pressure, there is no risk that the pressure in the cavity (29) is increased excessively or a unnecessary stress is applied to the molten resin material (4), which is favorable for improving the double refraction. However, with too small a mold clamp pressure, transfer characteristics may be insufficient. It is desirable to properly set the mold clamp pressure with this being taken into account.

When the charging pressure causes the metal molds (21), (22) to be opened as described above, molten resin material (4) may be intruded into the small gap between the metal molds (21), (22) to form so-called burrs. Therefore, the construction of the metal molds (21), (22) is desirable in which the burrs are not produced even when the metal molds (21, 22) are opened for example by about 0.5 mm. In the present embodiment, the inner peripheral surface (25a) of the ring-shaped outer peripheral stamper holder (25) provided to the movable metal mold (21) in association with the outer peripheral edge of the disk and the outer peripheral surface (22a) at the step corresponding to the disk diameter of the stationary metal mold (22) are provided in intersecting and substantially orthorgonal direction to the disk surface to minimize the burr production.

Figure 4:
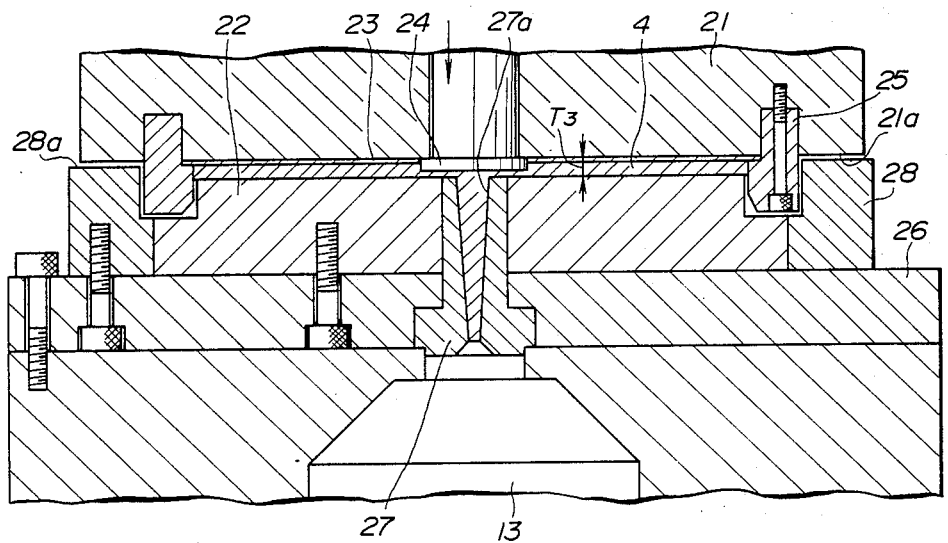

Upon termination of charging of the molten resin material (4), since the mold clamping pressure is maintained in the movable metal mold (21) at this stage, a predetermined uniform pressure is applied to the overall surface on the resin material (4), the metal molds (21), (22) are progressively clamped by contraction due to cooling, as shown in FIG. 4.

As a result, the molten resin material (4) in the cavity (29) is press-molded into a disk of a desired plate thickness $T_3$ while the signals (pits) of the stamper (23) as well as the guide grooves (pre-grooves) are transferred. At this stage, the resin material (4) is not completely solidified and the outer peripheral part is solidified as a skin layer, while the inner part is still in the fluid state as a core layer.

In the present embodiment, before the aforementioned state is reached, that is, before complete solidification of the resin material (4), the mold clamp pressure so far applied to the movable metal mold (21) is rapidly released to zero or to an extremely low pressure (so-called decompression).

For rapidly releasing the mold clamp pressure, the servo valve unit (31) is actuated through the mold calmp pressure adjustment unit (32) when using the aforementioned booster ram type mold clamp unit, for rapidly discharging the oil in the cylinder chamber of the main ram and the booster ram. Similarly, in case of the toggle type mold clamp unit, the pressure in the mold clamp cylinder is released to release the mold clamp pressure of the link mechanism (42). When using the general-purpose injection molding machine, the rapidly impressed pressure is released by opening the pressure valve, for example.

Our experiments have revealed that rapid release of the mold clamp pressure is highly effective to control double refraction.

Figure 7:
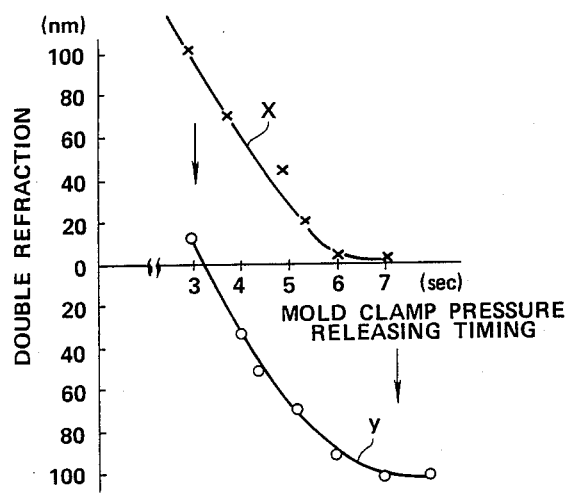
FIG. 7 is a graph showing the initial value of the double refraction as compared to the double refraction after the annealing.

Thus, as a result of our investigations into double refraction after termination of molding at 2.5 cm away from the center of a disk 13 cm in diameter, it has been shown that double refraction is changed as shown in FIG. 7 with the timing of releasing the aforementioned mold clamping pressure. Thus, in 3 to 7 seconds after injection of the molten resin material (4), the pressure was released (the resin material (4) was solidified almost completely in 7 seconds). It was shown that the initial value of double refraction of the disk obtained in dependence upon the releasing timing tends to become smaller on the plus side. Also, at this disk position, double refraction shifted to the minus side to the approximately same extent, irrespective of the extent, as shown in FIG. 7. It was shown in the present example, the initial value of the double refraction is indicated by the curve $x$ depending on the pressure release timing, whereas it is shifted to a position shown by a curve y in the drawing after annealing at 100° C. for five hours. The double refraction was measured herein as the value for double pass. Therefore, chronological changes of the double refraction can be suppressed by previously grasping the degree of shifting of the double refraction that can be expected from the chronological changes and setting the pressure release timing so that the initial value of double refraction on the plus side. This setting of the double refraction to the plus side means a substantial increase of the allowable range of the chronological changes of the double refraction in the optical disk such that it becomes possible to maintain the value of the double refraction of the disk for prolonged time within the prescribed range. However, when the aforementioned pressure is released immediately after injection, the outer peripheral portion of the resin material (4) is not solidified sufficiently such that the disk is unusable because of sporadic double refraction. The effect of pressure releasing is not exhibited after the resin material (4) is solidified completely such that it becomes impossible to control the double refraction.

In such manner, the mold clamp pressure of the movable metal mold (21) is released at a prescribed timing to control the initial value of the double refraction. The resin material (4) is allowed to cool completely while maintaining this state. The mold clamp pressure only is released at this time, with the metal molds (21), (22) being kept in a mutually contacting state.

The metal molds (21), (22) are ultimately opened to take out the molded disk.

When the disk thus taken out may be used directly, the double refraction approaches to zero gradually by chronological changes. However, when the disk is annealed, the double refraction becomes stable in the vicinity of zero. The temperature condition for annealing is practically in the range of 70° to 120° C. It is however preferred that the temperature be in the range of 100° to 120° C.

Figure 8:
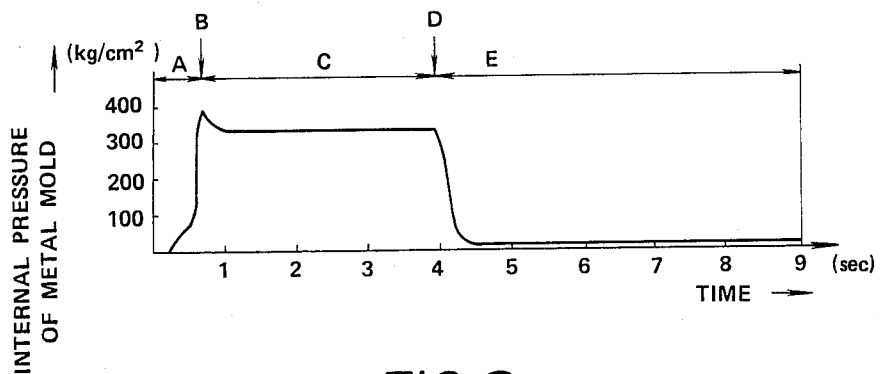
FIG. 8 is a timing chart showing the mode of changes in the internal pressure in the metal mold in the process of an embodiment of the present invention.

FIG. 8 shows the changes in the internal pressure of the metal molds (21), (22) through the above described process steps in a graphic form.

Figure 6:
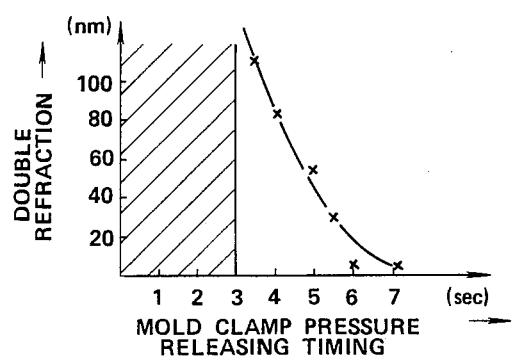
FIG. 6 is a graph showing the relation between the mold pressure releasing timing and the initial value of the double refraction of the disk.

Thus, at the time of injection of the molten resin material (4), the internal pressure is rapidly increased as shown at A in the drawing until the internal pressure reaches a peak on termination of injection into the cavity (29). Then, as shown at C in the drawing, a constant mold clamping pressure is uniformly applied to the resin material (4) as indicated at C in the drawing and the mold clamping pressure is rapidly released at a prescribed timing (at a position indicated at D in the drawing, which is determined by taking the results of FIG. 6 and the shifting of the double refraction to the minus side by chronological changes into account. The metal molds (21), (22) are then maintained at a low pressure approximately equal to zero, as indicated at E in the drawing. The mold is opened when the resin material (4), in 9 seconds herein, to take out the molded disk.

Figure 9:
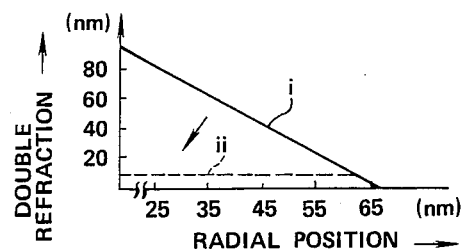
FIG. 9 is a chart showing the initial values of the double refraction in the radial direction of the disk obtained in the present embodiment and the same values after the annealing.

When the disk of polycarbonate resin is molded under these injection molding conditions, the producted disk exhibits the double refraction towards the plus side in the vicinity of the center as indicated at a curve i in FIG. 9, with the double refraction becoming gradually smaller towards the outside periphery when the disk is annealed for example at 100° C. for five hours, the double refraction on the plus side, the double refraction becomes stable at approximately zero from the inside towards the outside peripheries, as shown by a curve ii in FIG. 9.

Figure 10:
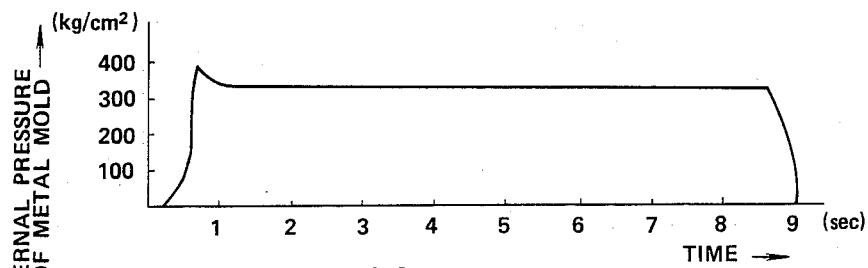
FIG. 10 is a timing chart showing the manner of changes in the internal pressure within the metal mold in a conventional process.
Figure 11:
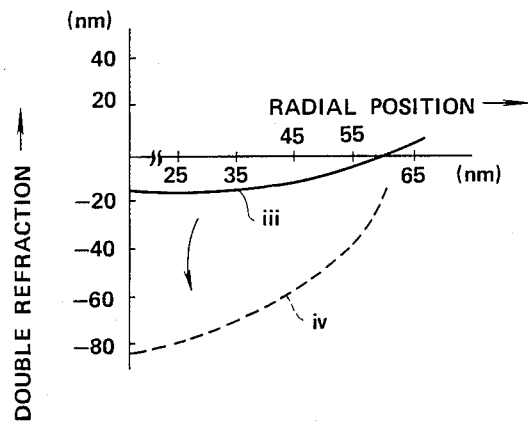
FIG. 11 is a graph showing the initial values of the double refraction in the radial direction of the disk produced disk in the prior-art example and the similar values after annealing.

When the constant internal pressure in the metal molds (21), (22) is continuously maintained after the injection of the molten resin material (4), as shown in FIG. 10, the double refraction of the produced disk initially shows a value close to zero, as shown by a curve iii in FIG. 11. However, when the disk is subjected to an anneal test at 100° C. for 5 hours for investigating into the chronological changes, it shows a larger value of double refraction on the minus side especially at the inside periphery as indicated by a curve iv in FIG. 11.

As described above, the method of the present invention may be said to consist in the separation of the transfer assuring zone and the double refraction control zone in the molding process from each other. Therefore it becomes possible to make an independent control of these conditions and to produce a molding disk simultaneously satisfying the mutually contradictory conditions, that is, double refraction and the transfer characteristics.

The present invention is not limited to the above described embodiment. For example, it does not matter what kind of the injection molding machine or what shape of the metal mold is employed. The disk size or the mold clamping pressure are the matter of design and may be changed as desired.

From the foregoing it may be seen that, according to the present invention, the molten resin material is injected into the cavity formed between the stationary metal mold and the movable metal mold for forming the disk, the mold clamping pressure is released during the time since the termination of the injection of the resin material until the resin material is solidified, so that it becomes possible to control the initial value of the double refraction to a prescribed value on the plus side and hence to produce the disk suffering from only little chronological changes to the double refraction.

Especially the produced molded disk is further subjected to annealing whereby the disk may be produced which is only negligible in chronological changes and high in reliability and in which the double refraction is stable in the vicinity of zero and in which chronological changes are small.

We claim as an invention:

1. A method for molding plastic material into a disk shaped substrate for an optical information record carrier comprising the steps of, injecting molten polycarbonate resin into a cavity defined by a stationary mold and a movable mold under application of mold clamp pressure between said molds, releasing said mold clamp pressure at a predetermined time after injection of said molten resin is completed and said molten resin is partially solidified, whereby a predetermined double refraction characteristic is obtained for said substrate, holding said resin in said molds under the released mold clamp pressure condition until said resin is solidified, and taking out the molded resin from said mold.

2. A method according to claim 1, said mold clamp pressure is released at a timing when a surface layer of said resin facing to said molds is solidified and inner portion of said resin is still molten.

3. A method according to claim 1, further comprises a step of annealing the molded substrate at a temperature between 70° and 120° C.

4. A method according to claim 1, including the step of injecting said molten polycarbonate resin into said cavity at a pressure which exceeds said mold clamp pressure.

5. A method according to claim 1, including the step of rapidly reducing said mold clamp pressure at said predetermined time.

* * * * *